April 11, 1950 J. G. JUHASZ 2,503,493
STARTER WINDING CUTOUT FOR MOTORS
Filed Sept. 28, 1944
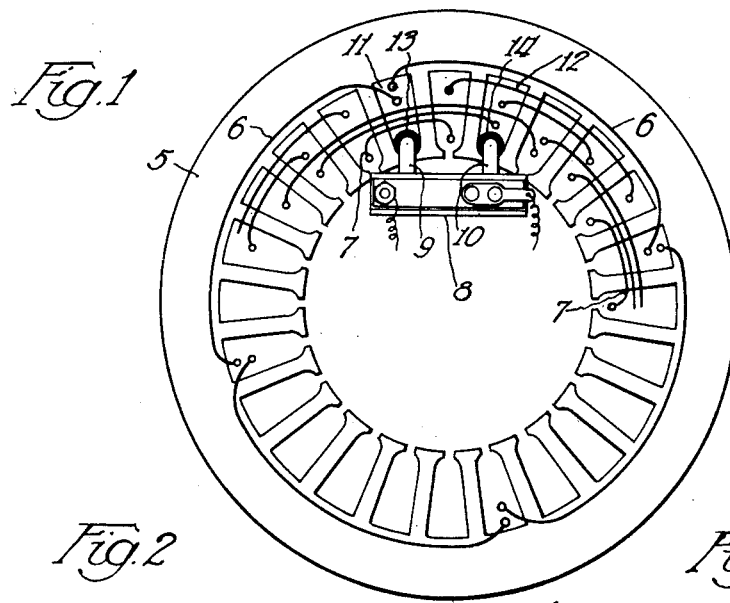
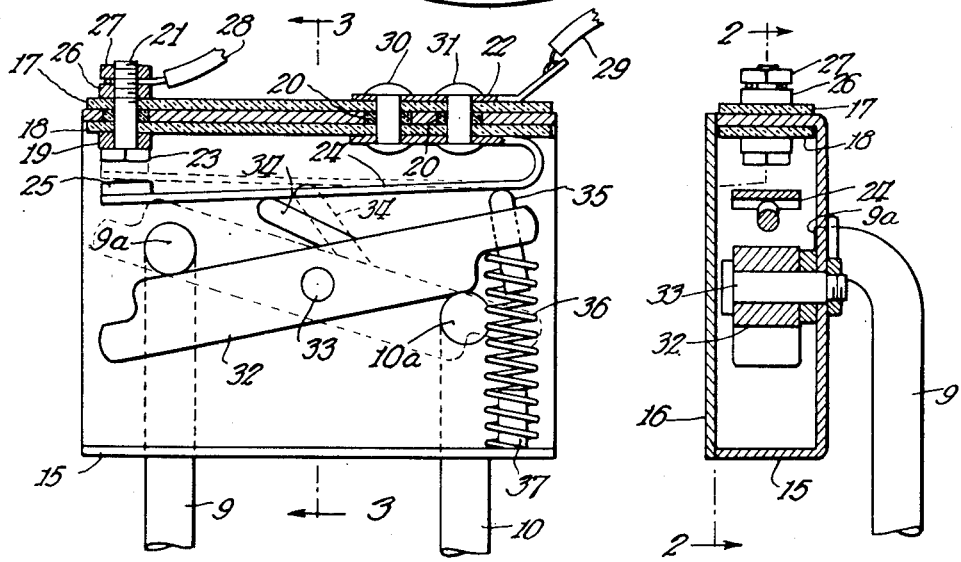
Inventor
James G. Juhasz
By: Zabel Carlson Greyhaugh & Wells
Attys.

Patented Apr. 11, 1950

2,503,493

UNITED STATES PATENT OFFICE 2,503,493

STARTER WINDING CUTOUT FOR MOTORS

James G. Juhasz, Chicago, Ill.

Application September 28, 1944, Serial No. 556,247

5 Claims. (Cl. 200—87)

1

The present invention relates to starter switches for cutting out the starter winding in split phase motors. It is the principal purpose of this invention to provide a switch of this character which is activated by the magnetic field of the motor and which will cut in the starting winding when the field is energized and hold the starting winding in circuit without any alternating current vibration or arc until the motor is brought up to the desired operating speed. When current is applied to a split phase motor, as in starting, the main operating winding takes an extremely high current. This causes a highly concentrated magnetic flux in the motor field and this fact is utilized as a means of causing actuation of the present switch. As the motor comes up to speed the current flow is materially reduced so that the magnetic field drops sufficiently to allow the switch to open.

My invention contemplates particularly a mechanism whereby any tendency of the switch to vibrate due to the reversals of the alternating current is overcome and there is no audible sound or electrical disturbance due to the contacts of the switch fluttering once they are brought together. Furthermore, when the starting current drops low enough for the switch to open and remove the starter winding from circuit means are provided whereby the opening of the switch occurs instantaneously.

The particular novel features and advantages of my invention will appear more fully from the following description, reference being had to the accompanying drawings wherein a preferred form of the invention is shown. It is to be understood however that the drawings and description are illustrative only and are not to be taken as limiting the invention except insofar as it is limited by the claims.

In the drawings:

Fig. 1 is a somewhat diagrammatic view of a split phase motor showing my invention as applied thereto;

Fig. 2 is an enlarged sectional view through a switch embodying my invention; and Fig. 3 is a cross sectional view taken on the line 3—3 of Fig. 2.

Referring now to the drawings, my invention is adapted to be utilized in connection with a split phase motor 5 wherein the main windings are indicated diagrammatically at 6 and the starter or auxiliary windings are indicated at 7. My novel starting switch is shown at 8 in Fig. 1.

The starting switch utilizes two iron poles 9 and 10, which poles are inserted in two winding

2 slots 11 and 12 of the motor core, suitable insulation being provided as indicated at 13 and 14 about the poles 9 and 10 so as to prevent damage by them of the windings in the slots 11 and 12 and to prevent any vibration of the poles in the slots. It will be noted that one of the poles 9 is inserted at the junction of two adjacent main windings while the other pole is inserted in the second slot from the first named pole.

The switch itself comprises a support in the form of a casing 15 of non-magnetic material having a cover 16 by which the moving parts of the switch are sealed in the casing 15. At one wall of the casing I provide insulating means consisting of two strips 17 and 18 and suitable washers 19 and 20 so that two wiring terminals 21 and 22 can be connected through the casing wall to a stationary contact 23 and a spring 24 which carries a movable contact 25. The contact 23 forms the head of a terminal post 21 on which nuts 26 and 27 are threaded to secure one lead 28 of the circuit for the starter winding. The other lead 29 of the circuit is soldered onto the terminal strip 22 and two rivets 30 and 31 connect the terminal strip 22 to the spring 24.

The two poles 9 and 10 extend through the casing 15 and are exposed within the casing as indicated by their ends 9a and 10a in Fig. 2. It will be noted that the end 9a is much closer to the spring 24 than the end 10a. An iron bar 32 is pivoted on a pivot pin 33 and provides a member that is utilized to actuate the spring 24 and bring the contacts 25 and 23 together. The bar 32 has a pin 34 of insulating material set therein at an angle of about 30° with respect to the longitudinal axis of the bar. This pin extends toward the spring 24 and is adapted to engage the spring as the bar moves in a clockwise direction when it is attracted by the pole ends 9a and 10a. A second pin 35 of insulating material is secured in one end of the bar 32 and serves first as a stop to engage the spring 24, and second, as a guide for a spring 36, one end of which presses against the bar 32 and tends to rotate it in a counterclockwise direction. The other end of the spring presses against a wall of the casing 15 and is held in position by a post 37 projecting inwardly from the wall.

When the main winding 6 of the motor is energized the heavy starting current energizes the poles 9 and 10 sufficiently to cause them to attract the bar 32. The starting current in a motor of this type is several times normal running current so that the magnetization of the core is extremely high at starting. This furnishes adequate energization of the poles 9 and 10 to initially attract the bar 32 against the tension of the spring 36. Attraction of the bar 32 causes the pin 34 to move toward the spring 24 and to wipe along the spring until the bar 32 actually becomes aligned with the pole ends 9a and 10a. In this position it will be noted that the tip of the pin 34 is substantially on a line perpendicular to the spring 24 as closed and extending through the axis 33 of the bar 32. In this position the pin 34 can exert a tremendous pressure tending to maintain the contacts 23 and 25 closed because in its approach to this position a rather large movement of the bar 32 accomplishes a small movement of the spring 24 with a substantial lever advantage. This advantage works two ways.

There is a natural tendency of the iron bar 32 to flutter or vibrate in response to the alternating vibrations of the energizing current and this would be communicated to the spring arm 24 except for the fact that the pin 34 moving as it does, substantially lengthwise of the spring, has quite a friction component to offset the vibration of the bar, and any vibration is thus effectively damped out.

As soon as the motor reaches the desired critical speed the spring 36 will overcome the magnetic attraction between the bar 32 and the pole faces 9a and 10a so as to start the bar 32 turning in a counterclockwise direction. Immediately the bar starts to turn the magnetic attraction is materially lessened between it and the pole faces so that there is a substantially instantaneous swing of the bar 32 to its full open position where the pin 35 strikes the spring 24.

The device can be set to any desired critical speed by utilizing a spring 36 of suitable strength. If there is an overload which tends to stall the motor the starting winding will be cut in by the increased current flow in the main winding, energizing the poles 9 and 10 sufficiently to attract the iron bar 32. The switch action is thus controlled entirely by the momentary speed and load conditions of the motor. The switch has a minimum amount of movable parts and can be sealed in the casing 15 so as to be explosion-proof.

From the foregoing description it is believed that the nature and advantages of the present invention will be readily apparent to those skilled in this art.

Having thus described my invention, what I claim as new and desire to secure by Letters Patent is:

1. A magnetically operable switch of the character described, comprising in combination a casing, a pair of spaced poles of magnetic material mounted in a wall of the casing and projecting therefrom for insertion in a magnetic field by which the switch is to be operated, a bar of magnetic material pivoted in said casing for rotation across the ends of said poles whereby when the poles are in a magnetic field they attract said bar, spring means in the casing urging said bar in a direction to oppose the magnetic attraction thereof by said poles, a stationary contact in the casing, a spring mounted in the casing to swing in the same direction as said bar, said spring having a contact thereon adapted to engage the stationary contact when pressure is applied to the spring to urge it toward the stationary contact and means on the bar for applying such pressure to the spring in response to the attraction of the bar by said poles, said last named means comprising a spring engaging pin of insulating material carried by said bar and extending away from the bar and toward the contact carrying end of the spring at an angle of about 30 degrees so that it is adapted to be moved lengthwise of the spring as the bar presses it against the spring, whereby the friction of said pin on the spring serves to damp out the vibrations of said bar due to fluctuations in the magnetic pull on the bar.

2. A switch of the character described, comprising a casing, magnetic pole means entering the casing through a side wall thereof and having a portion for insertion in the magnetic field of a motor and the like, a bar of magnetic material pivoted in the casing to swing over the end of the magnetic pole means whereby it is attracted by energization of the magnetic pole means, spring means in the casing opposing movement of the bar in response to the attraction of said magnetic pole means, a leaf spring in the casing extending in the plane of rotation of the bar, a pair of contacts controlled by movement of the leaf spring, a pin of insulating material secured in and extending angularly from the bar toward the spring and adapted to move the spring as the bar is attracted, the position of the spring on the pin serving as a damping means to prevent vibration of the bar and a second pin of insulating material in one end of the bar extending toward the secured end of the leaf spring and limiting the movement of the bar away from its attracted position by said spring means.

3. A switch of the character described, comprising a non-magnetic casing having a bottom wall, opposite side walls and cover means, magnetizable poles mounted in said bottom wall and projecting therefrom, a bar of magnetic material pivoted on said bottom wall between the poles, a pin in one end of the bar, a pin on one side wall, a spring between said pins and engaging them to urge the bar away from said poles, a contact on the other side wall, a spring arm on the other side wall carrying a contact thereon for engaging the first named contact, and a pin of insulating material set in said bar at such an angle that when the attraction of the bar toward the spring arm causes the contacts to engage, the friction of the pin on said spring arm is sufficient to overcome normal alternating current vibrations of the bar and prevent arcing at the contacts.

4. A magnetically operable switch of the character described, comprising in combination a support, a pair of spaced poles of magnetic material each having a portion mounted on said support and projecting therefrom for insertion in a magnetic field by which the switch is to be operated, a bar of magnetic material pivoted on said support for rotation across the ends of said poles whereby when the poles are in a magnetic field they attract said bar, spring means adjacent said support urging said bar in a direction to oppose the magnetic attraction thereof by said poles, a stationary contact on said support, a spring mounted on said support to swing in the same direction as said bar, said spring having a contact thereon adapted to engage the stationary contact when pressure is applied to the spring to urge it toward the stationary contact, and means on the bar for applying such pressure to the spring in response to the attraction of the bar by said poles, said last named means comprising a spring engaging pin of insulating material carried by said bar and extending away from the bar and toward the contact carrying end of the spring at an angle of about 30 degrees so that it is adapted to be moved lengthwise of the spring as the bar presses it against the spring, whereby the friction of said pin on the spring serves to damp out the vibrations of said bar due to fluctuation in the magnetic pull on the bar.

5. A switch of the character described, comprising a support, magnetic pole means having a portion for insertion in the magnetic field by which the switch is to be operated, a bar of magnetic material pivoted on said support to swing over the end of the magnetic pole means whereby it is attracted by energization of the magnetic pole means, spring means adjacent said support opposing movement of the bar in response to the attraction of said magnetic pole means, a leaf spring on said support extending in the plane of rotation of the bar, a pair of contacts controlled by movement of the leaf spring, a pin of insulating material secured in and extending angularly from the bar toward the spring and adapted to move the spring as the bar is attracted, the position of the spring on the pin serving as a damping means to prevent vibration of the bar and a second pin of insulating material in one end of the bar extending toward the secured end of the leaf spring and limiting the movement of the bar away from its attracted position by said spring means.

JAMES G. JUHASZ.

REFERENCES CITED

The following references are of record in the file of this patent:

UNITED STATES PATENTS

| Number | Name | Date |
|---|---|---|
| 464,948 | Wheeler | Dec. 8, 1891 |
| 1,094,690 | Wood | Apr. 28, 1914 |
| 1,104,077 | Smith | July 21, 1914 |
| 1,356,501 | Adams et al. | Oct. 19, 1920 |
| 1,696,107 | Bierbower | Jan. 8, 1928 |
| 1,767,104 | Volkman et al. | June 24, 1930 |
| 1,986,960 | Deguara | Jan. 8, 1935 |
| 2,411,405 | Yuhas | Nov. 19, 1946 |

FOREIGN PATENTS

| Number | Country | Date |
|---|---|---|
| 35,259 | Sweden | Mar. 5, 1912 |